United States Patent [19]

Long et al.

[11] 4,346,843
[45] Aug. 31, 1982

[54] PIVOTALLY MOUNTED HOSE REEL FRAME FOR IRRIGATION MACHINE

[75] Inventors: Z. Vance Long; Elvin F. Barwick, both of Tarboro, N.C.

[73] Assignee: Long Mfg. N.C., Inc., Tarboro, N.C.

[21] Appl. No.: 164,384

[22] Filed: Jun. 30, 1980

[51] Int. Cl.³ .............................................. B05H 75/00
[52] U.S. Cl. ..................................... 239/199; 137/615; 285/190
[58] Field of Search ............... 239/195, 197, 198, 199; 137/355.12, 355.19, 355.26, 615; 285/190

[56] References Cited

U.S. PATENT DOCUMENTS

| | | | |
|---|---|---|---|
| 1,975,596 | 10/1934 | Adamson | 239/177 |
| 2,872,217 | 10/1956 | May | 285/190 |
| 3,687,372 | 8/1972 | Badcock | 239/183 |
| 3,810,579 | 5/1974 | Di Palma | 239/197 |
| 4,186,881 | 2/1980 | Long | 239/198 |

FOREIGN PATENT DOCUMENTS 344704  3/1931  United Kingdom .......... 137/355.26

Primary Examiner—Robert B. Reeves
Assistant Examiner—Paul A. Sobel
Attorney, Agent, or Firm—Dowell & Dowell

[57] ABSTRACT

An apparatus for mounting the hose reel frame of an irrigation machine on a support frame in a manner such that the hose reel frame may be rotated to a desired position while water under pressure is passing through such hose. The reel frame is rotatably supported about a substantially vertical axis so that water under pressure flows from a source through a rotary axial connection to the hose carried by the reel.

2 Claims, 6 Drawing Figures

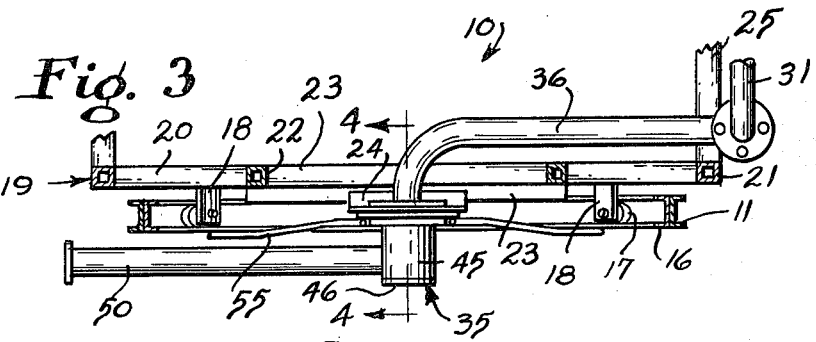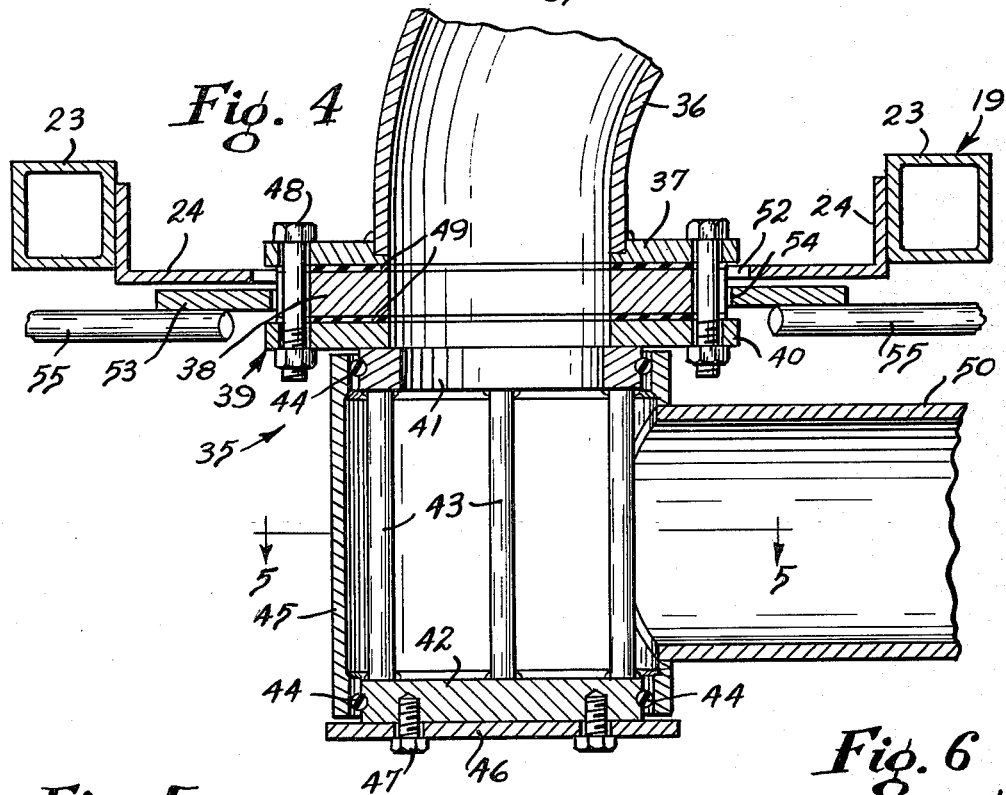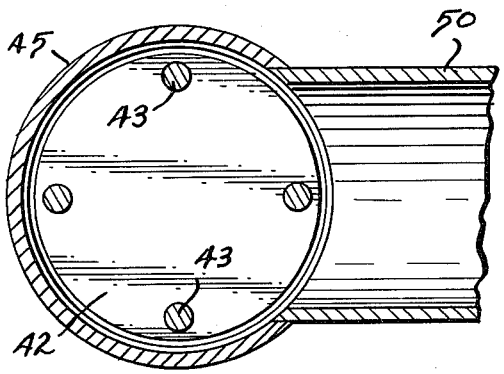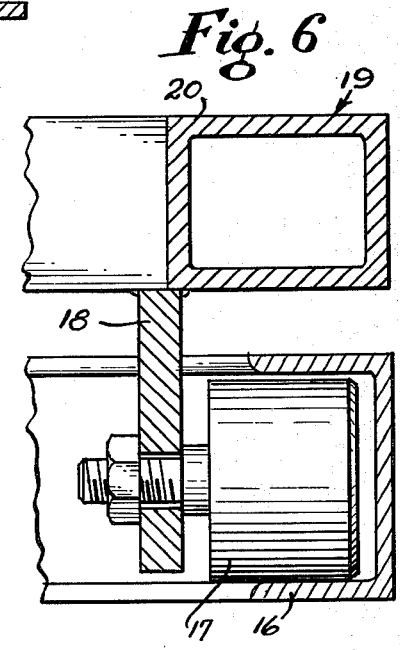

PIVOTALLY MOUNTED HOSE REEL FRAME FOR IRRIGATION MACHINE

SUMMARY OF THE INVENTION

In the past, the reels of relatively large irrigation machines of the type shown in Long U.S. Pat. No. 4,186,881 normally have been rotatably mounted about a generally horizontal axis on a frame and such frame has been rotatably mounted about a generally vertical axis relative to a movable chassis. In these prior art structures, water under pressure is conducted from a standpipe through a flexible feed pipe to a manifold on the irrigation machine so that the water under pressure can be used as the motive force to rotate the reel when desired. Although the reel frame is rotatably mounted so that the hose may extend in a desired direction, the force of the water in the feed pipe has had a tendency to cause the feed pipe to assume a straight line position and this has tended to cause an undesirable rotation of the reel frame and to interfere with repositioning of the reel frame.

The present invention is embodied in an apparatus for connecting the feed pipe of a relatively large irrigation machine to the water manifold of such machine in a manner to permit the hose reel mounting frame to be easily rotated even when the feed pipe and the manifold are filled with water under pressure and which eliminates the tendency of the feed pipe to rotate the hose reel mounting frame.

It is an object of the invention to provide a hose reel mounting frame for a large irrigation machine in which the mounting frame is rotatable about a generally vertical axis and in which water under pressure is conducted along such vertical axis to permit the mounting frame to be rotated when desired.

Another object of the invention is to provide a connection for connecting a high pressure feed pipe to the manifold of a large irrigation machine while substantially eliminating the tendency of the feed pipe causing the hose reel mounting frame to rotate.

BRIEF DESCRIPTION OF THE DRAWINGS

FIG. 3 is a sectional view taken on the line 3—3 of FIG. 2.

FIG. 4 is an enlarged sectional view taken on the line 4—4 of FIG. 3.

FIG. 5 is a sectional view taken on the line 5—5 of FIG. 4.

FIG. 6 is an enlarged sectional view taken on the line 6—6 of FIG. 2.

DESCRIPTION OF THE PREFERRED EMBODIMENT

Figure 1:
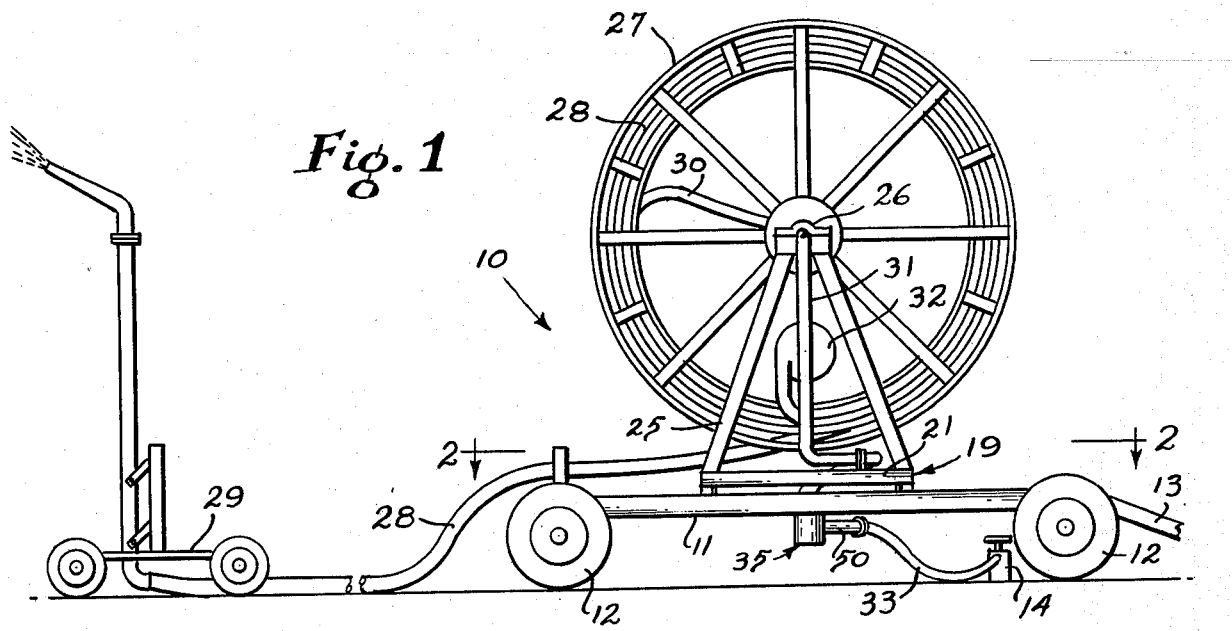
FIG. 1 is a side elevational view illustrating one application of the invention.
Figure 2:
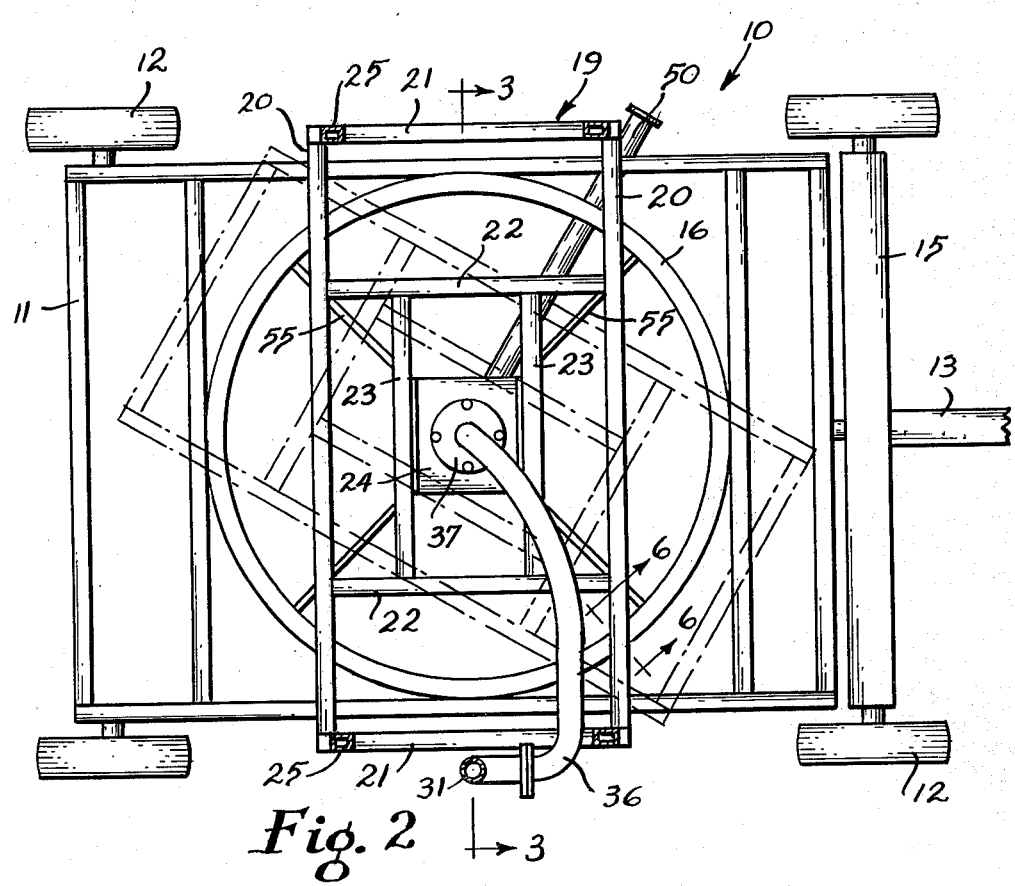
FIG. 2 is an enlarged sectional view taken on the line 2—2 of FIG. 1.

With continued reference to the drawings, a relatively large irrigation machine 10 is provided which includes a vehicle having a chassis or main frame 11 supported by two or more wheels 12. The main frame 11 has a tongue 13 by means of which the machine 10 may be towed by a propelling vehicle (not shown) to a desired location such as adjacent to a standpipe or hydrant 14. When the main frame is supported by four wheels (as shown in FIGS. 1 and 2) the tongue 13 preferably is attached to a pivotally mounted steering bar 15 and when the main frame is supported by two wheels, the tongue is rigidly connected to the main frame and may have a support jack to keep the main frame generally level when the machine is in use.

The main frame 11 includes a substantially circular track 16 located generally centrally thereof and such track receives rollers 17 mounted on depending brackets 18 which, in turn, are carried by a hose reel support frame 19 in such a manner that the support frame 19 is supported above the main frame 11 and may be rotated relative thereto. As shown best in FIG. 2, the reel support frame 19 includes a pair of elongated generally parallel cross members 20 connected by generally parallel end members 21. A pair of generally parallel cross braces 22 are welded or otherwise attached to the cross members 20 intermediate the ends thereof and such cross braces are generally parallel with the end members 21. A pair of longitudinal braces 23 extend between and are connected to the cross braces 22 and such longitudinal braces are generally parallel with the cross members 20. A plate 24 is welded or otherwise attached to the longitudinal braces 23 generally centrally of the reel support frame for a purpose which will be described later.

The reel support frame 19 has a pair of opposed upstanding mounting brackets 25 at opposite ends and each of such brackets is provided with a pillow block or bearing 26 at the upper end. Such pillow blocks rotatably support a conventional central axial pipe of a reel 27 in such a manner that the reel may be rotated about a generally horizontal axis.

An elongated flexible hose 28 having a diameter of approximately 4½ inches (11.33 CM) is wound on the reel and the free end of such hose is attached to a carriage mounted sprinkler 29, while the inner end of such hose communicates with the central axial pipe of the reel 27 by means of a connector pipe 30 to receive water under pressure therefrom. Normally the hose is unwound by releasing the reel and pulling the sprinkler 29 away from the reel in any desired manner, such as by a tractor or other propelling vehicle.

In order to wind the hose onto the reel, a manifold or supply pipe 31 is carried by one of the mounting brackets 25 of the reel support frame and a water driven turbine 32 is located contiguous to the supply pipe. Water under a pressure of approximately 150 PSI is introduced into the supply pipe 31 and a portion of the water under pressure within the supply pipe is diverted through the turbine and is reintroduced into the water flowing through the supply pipe. The turbine operates a drive mechanism (not shown) which rotates the reel 27 in a direction to wind the hose onto the reel as the water is being discharged from the sprinkler. In the past, the supply pipe 31 has been connected directly to the standpipe or hydrant 14 by a flexible feed pipe 33 and, since the supply pipe has been located at one side of the reel support frame 19, the water under pressure within the flexible feed pipe has had a tendency to cause undesirable rotation of the reel support frame.

With particular reference to FIGS. 4 & 5, in order to eliminate any undesirable rotation of the reel support frame 19, a rotatable connection or union 35 is positioned generally centrally of the main frame 11 and the reel support frame 19. Such union includes an outlet pipe 36, having one end connected to the supply pipe 31 and the other end is welded or otherwise attached to a flange 37 located adjacent to the plate 24. A spacer plate 38, having a central opening of a size substantially the same as the inside diameter of the outlet pipe 36, is located adjacent to the flange 37 and spaces such flange from the body 39 of the union 35. The body 39 includes a mounting plate 40 having a central opening of a size substantially the same diameter as the opening in the spacer plate 38 and such mounting plate is welded or otherwise attached to a ring member 41. A generally cylindrical bottom plate 42 is vertically spaced below the ring member 41 and is fixed thereto by a plurality of posts 43 which are welded or otherwise attached at opposite ends to the ring member and bottom plate 41 and 42 respectively.

Each of the ring members and bottom plate is provided with an annular sealing member 44 extending entirely around its periphery. A sleeve 45 encompasses the ring member 41 and the bottom plate 42 and the inner periphery of such sleeve slidably engages the sealing members 44 in such a manner that the sleeve may rotate relative to the body 39 of the union while substantially preventing the escape of water therefrom. A keeper 46 is connected to the bottom plate 42 by fasteners 47 and extends outwardly thereof to a position underlying the sleeve 45 to prevent the sleeve from becoming separated from the body 39. The flange 37, spacer plate 38 and the mounting plate 40 are connected together in assembled relationship by a plurality of fasteners 48. Gaskets or other sealants 49 normally are disposed between the assembled members to prevent the escape of water.

One end of an inlet pipe 50 extends into the wall of the sleeve 45 and is welded thereto in a position to introduce water under pressure into the union between the ring member 41 and the bottom plate 42 and the other end is connected to the standpipe 14 by the feed pipe 33. Normally, water under pressure which passes through a pipe union causes a thrust load on the union which makes it difficult to rotate one part of the union relative to the other. However, when the water under pressure is introduced into the union 35 between the ring member 41 and the bottom plate 42 substantially zero thrust load is applied to such union because the ring member 41 and bottom plate 42 are fixed to each other by the posts 43. Accordingly, the sleeve 45 and the body 39 may rotate relative to each other substantially as easily when water under pressure is passing therethrough as they can when no water is passing through the union.

In order to maintain the union 35 substantially centrally of the support frame 19, the plate 24 may be provided with an opening 52 of a size slightly larger in diameter than the diameter of the union. In this case, the union is supported within the opening 52 by the supply pipe 31 and the outlet pipe 36. However, it is contemplated that the opening 52 in the support plate 24 could be smaller and the plate 24 could have openings for receiving the fasteners 48. In this case, a portion of the plate 24 could be interposed between the flange 37 and the spacer plate 38 with appropriate gaskets between such elements so that the union 35 could be supported directly by the plate 24 and the reel support frame 19.

Regardless of how the union 35 is supported, it is desirable to maintain the vertical axis of such union along the vertical axis of the main frame 11. In order to do this, a guide member 53 is provided having an opening 54, the axis of which is located along the vertical axis of the main frame. Such guide member is connected to the main frame by a plurality of support rods 55 which support the guide member 53 in a position adjacent to the plate 24. The opening 54 is of a diameter slightly larger than the diameter of the spacer plate 38. As shown best in FIG. 4, the flange 37 of the outlet pipe and mounting plate 40 of the union body are larger in diameter than the opening 54 of the guide member 53 so that the union is freely rotatable within the opening 54 but the guide member 53 limits upward and downward movement of the union 35.

It will be apparent that the union 37 is freely rotatable relative to the main frame 11 when the reel support frame 19 is rotated and that the sleeve 45 and inlet pipe 50 are freely rotatable relative to the body 39 of the union 37.

In the operation of the device, the irrigation machine 10 is moved to a desired position near a standpipe 14. When the machine is parked, the inlet pipe 50 and sleeve 45 are rotated so that the inlet pipe extends towards the standpipe and the feed pipe 33 connects the standpipe to the inlet pipe. Then the reel support frame 19 is rotated to any desired position relative to the main frame 11. The sprinkler 29 is moved away from the irrigation machine while the hose 28 is being unwound from the reel 27 until the sprinkler is positioned at a desired location or the hose reaches the end of its length. Thereafter the valve of the standpipe or hydrant 14 is opened to permit water under pressure to pass through the feed pipe 33 into the rotatable union 35. From the union 35 such water under pressure passes into the outlet pipe 36 and then through the supply pipe 31 and hose 28 to the sprinkler 29 where it is discharged. Since the union 35 is located generally axially of the track 16 which supports the reel support frame, any tendency of the water under pressure to rotate the reel support frame is eliminated.

We claim:

1. In an irrigation machine, a rotary union for use in a high pressure fluid line having a predetermined inner diameter comprising a body, said body including a ring member having an inner diameter which is at least substantially as large as the inner diameter of said fluid line and a bottom member, a plurality of post means disposed outwardly of the inner diameter of said fluid line and connecting said ring member to said bottom member in fixed spaced relationship with each other, sleeve means disposed about said ring member and said bottom member, seal means connecting said sleeve means to said ring member and said bottom member to permit said sleeve means to rotate relative to said body while substantially preventing the escape of fluid from said body, means for connecting a first portion of said fluid line to said ring member in axial alignment with the inner diameter thereof, and means for connecting a second portion of said fluid line to said sleeve means in a position to introduce fluid into said body between said ring member and said bottom member, whereby substantially no thrust load is applied to said rotary union so that said sleeve means is freely rotated relative to said body while fluid under pressure is passing through said union and the flow of fluid through said union is not restricted.

2. In an irrigation machine including a vehicle having a main frame, a hose reel support frame rotatably mounted on said main frame about a generally vertical axis, a reel carried by said support frame and being rotatably mounted about a generally horizontal axis, said reel having an elongated hose removably carried thereon, supply pipe means having a predetermined inner diameter communicating with said hose, and feed pipe means connected to a source of water under pressure, the improvement comprising a rotatable connection located along said generally vertical axis, said rotatable connection including a body having first and second members, said first member having a central opening of a size substantially similar to the inner diameter of said supply pipe, a plurality of post means disposed outwardly of said opening and connecting said first and second members together in spaced relationship, sleeve means rotatably mounted on said first and second members of said body, seal means connecting said first and second members to said sleeve means while permitting relative rotation therebetween, said supply pipe means being connected to said first member of said body in axial alignment with said opening, said feed pipe means being connected to said sleeve means for supplying water under pressure to said rotatable connection, whereby substantially no thrust load is applied to said rotary connection so that said sleeve means rotates easily relative to said body and the flow of water under pressure through said rotatable connection is not restricted.

* * * * *